United States Patent

Lauck

[15] 3,684,783
[45] Aug. 15, 1972

[54] DILUENT RECOVERY PROCESS

[72] Inventor: John D. Lauck, 111 Crestwood Drive, Parkersburg, W. Va. 26101

[22] Filed: Nov. 5, 1970

[21] Appl. No.: 87,046

[52] U.S. Cl..............260/85.1, 260/88.2 B, 260/93.1, 260/93.5 S, 260/93.5 A, 260/93.7, 260/94.7 R, 260/94.9 F, 260/878 R, 260/880, 260/886
[51] Int. Cl............................C08f 1/88, C08d 5/00
[58] Field of Search ................260/94.9 F, 93.7, 85.1

[56] References Cited

UNITED STATES PATENTS

| | | | |
|---|---|---|---|
| 2,930,786 | 3/1960 | Cottle et al............260/94.9 F |
| 3,436,380 | 4/1969 | Davison..................260/94.9 F |
| 3,296,240 | 1/1967 | MacDonald et al...260/94.9 E |

Primary Examiner—Joseph L. Scholer
Assistant Examiner—A. Holler
Attorney—Martin S. Baer and William H. Myers

[57] ABSTRACT

An improved process for separating a volatile organic diluent from a low density olefin polymer in solution of suspension comprises vaporizing the diluent with steam and water at an elevated temperature and separating a slurry of polymer and water; discharging a vapor stream containing a small amount of polymer particles into a cyclone vessel; withdrawing the vapors substantially free of polymer and recovering the diluent; and removing the separated particles from the cyclone with a flow of water at a downward velocity exceeding the rise velocity of the particles through the water to prevent agglomeration of the particles.

4 Claims, 1 Drawing Figure

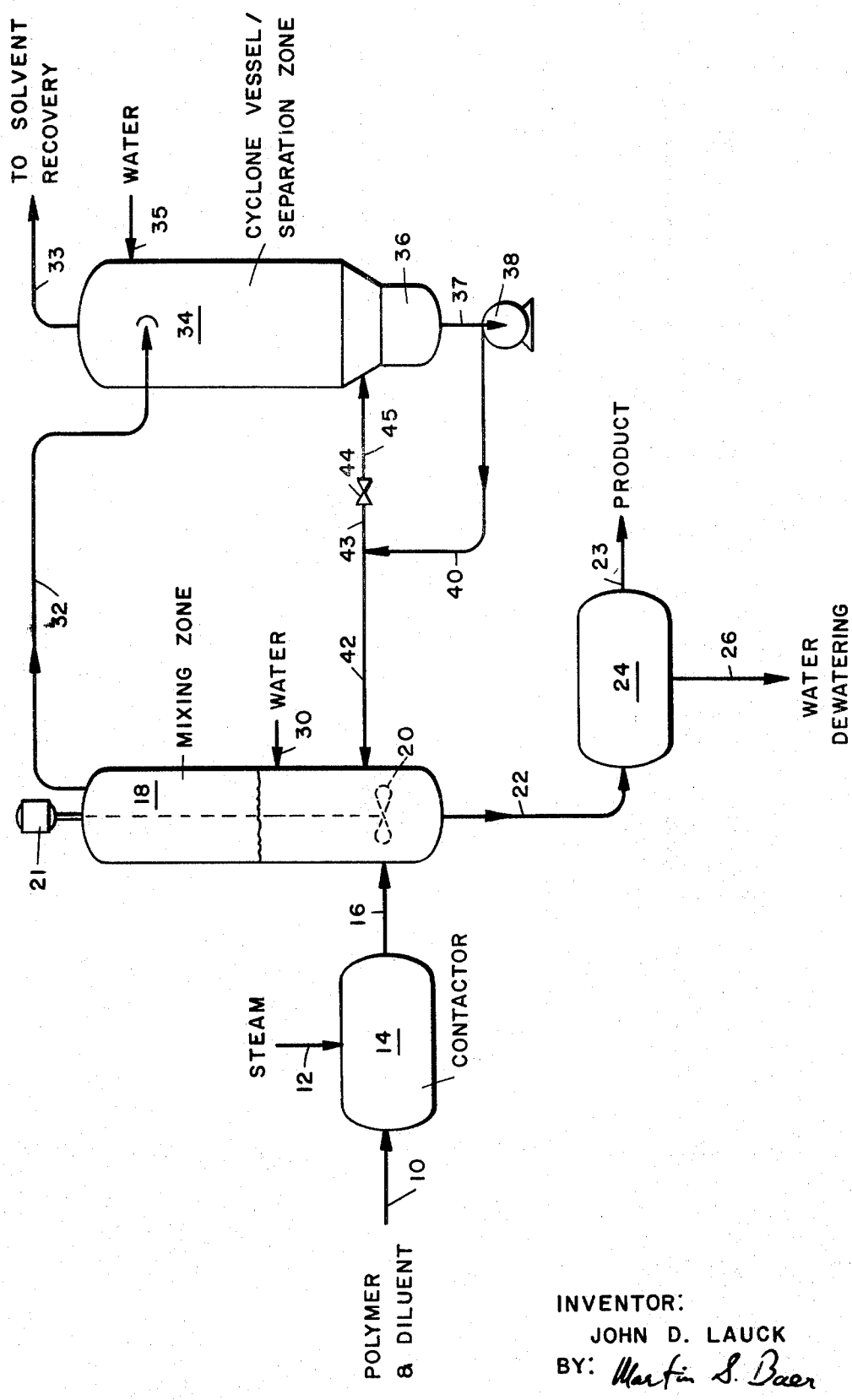

DILUENT RECOVERY PROCESS

This invention relates to a method for separating a volatile organic diluent from an olefin polymer in solution or suspension. More particularly it relates to removal of finely divided solid polymer from vapors resulting from heating the mixture of polymer and diluent with steam and water at an elevated temperature.

A wide variety of processes are known in the art for the preparation of solid polymers of olefins. Often such polymerization processes employ volatile organic liquids as diluents or reaction media. In some of these processes the polymer is produced in the form of a solution or as a slurry in diluent, and must be recovered therefrom. Separation of the diluent can be successfully accomplished in a process comprising contacting a mixture of polymer and diluent with steam at an elevated temperature, e.g., in an apparatus such as described in U.S. Pat. No. 3,050,113 to Rundquist. In said apparatus the mixture of polymer and diluent enters one conduit, steam under pressure enters a second conduit, and a mixture of steam, polymer and diluent is sprayed through a nozzle outlet into a vessel containing water from which the solvent vapor is withdrawn and is cooled and processed for re-use.

A difficulty arises that the polymer often has a density less than water, causing it to rise to the surface. This, and the turbulence of vaporization, sometimes results in a considerable amount of particulate polymer being entrained in the mixed vapors of solvent and water. These polymer particles adhere and accumulate on the surfaces of heat exchanger equipment used to cool the vapor stream. The accumulated polymer generally has low heat transfer properties, thereby reducing the efficiency of the heat exchange equipment. In a like manner the polymer particles, particularly rubber polymers, tend to agglomerate and adhere to conventional particle separation means such as cyclones, screens, filters, and the like, reducing their efficiency and requiring frequent cleaning. Such cleaning is often disruptive of continuous operation of the process. It is thus an object to provide a method for removing particulate olefin polymer contained in a vapor stream. Another object is to provide a method for minimizing equipment fouling by polymer. A further object is to provide a method for separating a volatile diluent from a polymer having a density less than water. A still further object is to provide a method for recovering the polymer from the diluent vapor in a continuous manner. Yet another object is to provide an improved method for separating rubbery olefin polymers from a slurry or solution of said polymers in a volatile organic liquid.

The above and other objects of the invention will be understood by those skilled in the art from the following specification and claims.

According to the invention, a method is provided for separating a solid polymer of a least one olefin from a mixture of said polymer with a volatile organic diluent which comprises contacting said mixture with steam to form a contact product; mixing said contact product in a mixing zone with water at an elevated temperature to form a slurry of polymer and water; withdrawing said slurry from said mixing zone; passing from said mixing zone mixed vapors of solvent and water and containing particulate solid polymer into an upright centrifugal vapor-solid separation zone, e.g., a cyclone vessel whose upper dimension is selected to optimize deentrainment of the particles; passing from the separation zone a vapor stream substantially free of polymer; introducing water into the upper section of said separation zone sufficient to maintain liquid phase on the upright surfaces and to maintain a level of liquid comprising an aqueous slurry of polymer at the lower exit of the separation zone; withdrawing from said lower exit of the separation zone said aqueous slurry at a rate wherein the downward velocity of the water exceeds the rise velocity of the solid polymer through the water. The aqueous slurry from the cyclone may be discarded, but advantageously is treated to recover the polymer. The vapor stream substantially free of polymer is subsequently cooled and the diluent recovered for re-use.

By using the method according to the invention, the particulate solid polymer being removed from the cyclone is substantially prevented from agglomerating and fouling or plugging the cyclone and downstream process equipment. An additional feature is that the slurry recovered from the cyclone may be recycled to the mixing zone for recovery together with the principal polymer, by conventional water separation techniques. The present invention can be carried out in an apparatus as shown in the accompanying diagrammatic illustration. A mixture of an olefin polymer and volatile organic diluent, e.g., from a polymerization reactor (not shown), such as a mixture of 10 percent by weight polybutadiene in a hydrocarbon diluent boiling between 80° and 160° F is charged via conduit 10 to contractor 14 and contacted with steam 12 and is passed via conduit 16 to a mixing vessel 18 containing hot water. The mixing vessel 18 is equipped with mixing means 20, e.g., a propeller agitator driven by motor means 21 to keep the polybutadiene suspended as a slurry in the hot water. The aqueous slurry of polymer is withdrawn via conduit 22 to conventional liquid-solids separation means 24, such as centrifugation, filtration, screening and the like. The polybutadiene removed via conduit 23 may be further dried by conventional means (not shown), such as a hot air dryer. The separated water removed via conduit 26 may be discarded or re-used. The mixing in vessel 18 is ordinarily carried out at elevated temperatures, e.g., 150°–290° F, and at more preferably in the range between 180° and 260° F and pressures in the range between −10 and −50 psig, preferably, however, at an elevated pressure, e.g., autogenous pressure in the range between about 3–50 psig, more preferably between about 5 and 40 psig; the particular temperature and pressure may vary according to the volatility of the particular organic diluent. Water may be added to the mixing zone via conduit 30. Heating of the mixing zone may be accomplished by any conventional method, e.g., via steam entering with the contact mixture, by heating the mixing vessel (not shown), or by heating the water added via conduit 30 by auxiliary heaters (not shown). Vapors from the mixing vessel are passed as a mixture of diluent and water vapor containing a small amount of entrained solid polymer via conduit 32 disposed from the upper portion of the mixing vessel to a separation zone here shown as cyclone vessel 34 wherein the solid polymer is removed, and the mixed solvent and water vapor is passed via conduit 33 from the upper exit of the cyclone. The substantially polymer-free mixed vapors are passed to chilling equipment (not shown) for condensation, and the diluent thereafter separated from the water by conventional techniques such as decantation, centrifugation, fractionation and the like, and recovered for re-use.

In the upper part of cyclone 34, water is provided via conduit 35 to flow on the upright surfaces and carry the particles of solid polymer to a lower exit 36 where a water seal is maintained to avoid loss of solvent vapor. The seal may be maintained by level controlling means (not shown). The flow is adjusted such that the downward velocity of the water at the exit end exceeds the rise velocity of the solid polymer through the water, whereby the particles are prevented from floating to the upper surface of the water seal and agglomerating. Downward water velocities are suitable in the range from about 1.2 to about 8 feet/second. The mixture of polymer and water is removed from the lower exit end of the cyclone via conduit 37 and is passed by any conventional method, e.g., by pump means 38, via conduits 40 and 42 to mixing zone 18. In a preferred embodiment a substantial portion of the discharge of pump means 38 is recycled via conduits 40, 43, valve 44, and conduit 45 to the lower portion of cyclone 34, whereby the amount of water introduced to cyclone 34 via conduit 35 can be maintained at an economic low level.

The process according to the invention may suitably be employed with polymers of olefins having up to about nine carbon atoms, e.g., ethylene, propylene, cyclopentene, butadiene, isoprene, styrene, alpha-methyl styrene and the like. The polymers may be homopolymers, or graft, random or block copolymers of said olefins. The process is suitable for olefin polymers having a density less than water, e.g., a specific gravity in the range from about 0.80 to about 0.98, and more preferably between about 0.90–0.97. Moreover, the process finds particular utility with rubbery, i.e., predominately non-crystalline polymers such as, e.g., styrene butadiene copolymers wherein the problem of agglomeration of particles under diluent recovery conditions is most severe. In accordance with the ASTM definition, a rubbery polymer herein refers to "a material which at room temperature can be stretched repeatedly to at least twice its original length and upon immediate release of the stress will return with force to its approximate original length."

These polymers are produced by a wide variety of processes employing, e.g., organometallic catalysts of the so-called Ziegler-Natta type wherein a compound of a transition metal of Group IV to VIII such as cobalt chloride is reduced by a strong reducing agent such as an organometallic compound of a Group I to III metal such as, e.g., aluminum triethyl. Other known processes employ, e.g., any of a variety of hydrocarbyl lithium catalysts.

Many of these processes employ as diluent volatile organic liquids, e.g., hydrocarbons of about four to 10 carbon atoms such as butane, n-pentane, isopentane, cyclohexane, heptane, petroleum ether, benzene, toluene and the like. Exemplary processes are described for example in U.S. Pat. No. 3,066,127 to Carlson et al., U.S. Pat. No. 3,265,765 to Holden et al, and U.S. Pat. No. 3,480,696 to Hassell et al. In addition, the process according to the invention applies as well to separation of mixtures of polymer and diluent employed, e.g., in processes for hydrogenation of the polymer, solvent blending, and the like.

The process of the invention may be better understood by reference to the following description of a specific embodiment as applied to the accompanying drawing. A mixture of 10 percent by weight of polyisoprene in isopentane is charged to the contactor and contacted with steam at about 100 psig, the product passed to the mixing vessel 18 containing water at 190° F. The pressure in mixing vessel 18 is about 20 psig. Polymer and water is withdrawn from the mixing zone. Mixed vapors of steam and isopentane in a weight ratio of about 1.2:1 and containing a small amount of polyisoprene particles are passed at relatively high velocity via conduit 32 to cyclone 34 and the mixed vapors substantially free of polymer are passed via conduit 33 to be cooled and diluent recovered therefrom. The walls of the cyclone are rinsed by tangential flow of water at a rate of about 1 gallon per unit of time. A dilute slurry of deentrained polymer in water is removed from the exit end of the cyclone at a linear velocity of about 3 feet/second whereby the polymer particles are prevented from floating to the surface and forming a mat. The flow rate of the dilute aqueous slurry is about 4 gallons per unit of time, via conduit 37, pump 38 and conduit 40. The flow of aqueous slurry is divided and regulated such that 3 gallons per unit of time flows via conduits 40, 43, valve 45 and conduit 44 to recycle to the lower portion of cyclone 34; the remainder of the dilute aqueous slurry is passed from pump 38 via conduits 40 and 42 to the mixing zone 18.

I claim as my invention:

1. In a process for separating a solid rubbery polymer of a monomeric olefin of up to nine carbon atoms from a mixture of said polymer with a volatile organic diluent which comprises contacting said mixture with steam to form a contact product, mixing said contact product with water in a mixing zone at an elevated temperature in the range between 180° and 260° F to form a slurry of polymer and water and a vaporous mixture of diluent and steam; withdrawing said slurry from said mixing zone; passing from said mixing zone the vaporous mixture of solvent and water and containing entrained particulate solid polymer into an upright centrifugal vapor-solid separation zone; withdrawing from said separation zone a vapor stream substantially free of polymer; introducing water into the upper section of said separation zone, sufficient to maintain liquid phase on the interior upright surfaces and to maintain a liquid seal comprising an aqueous slurry of polymer at the lower exit end of said separating zone; the improvement comprising withdrawing from said separating zone said aqueous slurry at a rate wherein the downward velocity of the water in the liquid seal exceeds the rise velocity of said polymer through the water.

2. A process as in claim 1 wherein said olefin polymer has a specific gravity in the range from about 0.80 to about 0.98.

3. A process as in claim 1 wherein at least a portion of the aqueous slurry from said separation zone is recycled to the lower portion of said separating zone.

4. A process as in claim 1 wherein said volatile organic diluent is a hydrocarbon of about four to 10 carbon atoms.

* * * * *

PO-1050
(5/69)

UNITED STATES PATENT OFFICE
CERTIFICATE OF CORRECTION

Patent No. 3,684,783              Dated August 15, 1972

Inventor(s) JOHN D. LAUCK

It is certified that error appears in the above-identified patent and that said Letters Patent are hereby corrected as shown below:

Following the inventor's name and address in the heading of the patent, reference to the assignment has been omitted, which reference should read:

"assignor to Shell Oil Company, New York, N.Y."

Signed and sealed this 15th day of May 1973.

(SEAL)
Attest:

EDWARD M. FLETCHER, JR.           ROBERT GOTTSCHALK
Attesting Officer                 Commissioner of Patents